United States Patent [19]

Sargent et al.

[11] 4,145,773
[45] Mar. 27, 1979

[54] PORTABLE TOILET WITH VENT MEANS FOR THE HOLDING TANK

[75] Inventors: Frank T. Sargent; John M. Antos; Erin J. Lindsay, all of Ann Arbor, Mich.

[73] Assignee: Thetford Corporation, Ann Arbor, Mich.

[21] Appl. No.: 892,762

[22] Filed: Apr. 3, 1978

[51] Int. Cl.² .............................................. E03D 1/00
[52] U.S. Cl. .......................................... 4/321; 4/347; 4/434
[58] Field of Search ................... 4/321, 115, 116, 447, 4/322, 323, 441, 440, 442, 431, 434, 435, 438, 439

[56] References Cited

U.S. PATENT DOCUMENTS

| | | | |
|---|---|---|---|
| 3,551,916 | 1/1971 | Reid | 4/347 |
| 3,570,018 | 3/1971 | Sargent et al. | 4/115 |
| 3,747,130 | 7/1973 | Sargent et al. | 4/321 |
| 3,801,991 | 4/1974 | Fulton et al. | 4/321 X |
| 3,851,339 | 12/1974 | Flinner et al. | 4/321 X |
| 3,949,430 | 4/1976 | Miller et al. | 4/321 |
| 4,032,996 | 7/1977 | Sargent et al. | 4/441 |

*Primary Examiner*—Henry K. Artis
*Attorney, Agent, or Firm*—Olsen & Stephenson

[57] ABSTRACT

Apparatus for venting a sealed holding tank of a portable toilet to equalize the atmosphere and tank pressures before opening and closing the inlet port of the holding tank, said holding tank including a valve assembly for opening and closing the inlet port of the tank, and a vent port means in the tank associated with the valve assembly so that when the valve assembly is moved toward its open position, the vent means will be opened immediately prior to opening of the inlet port and when the valve assembly is moved toward its closed position, the vent port will be closed immediately after closing of the inlet port.

8 Claims, 4 Drawing Figures

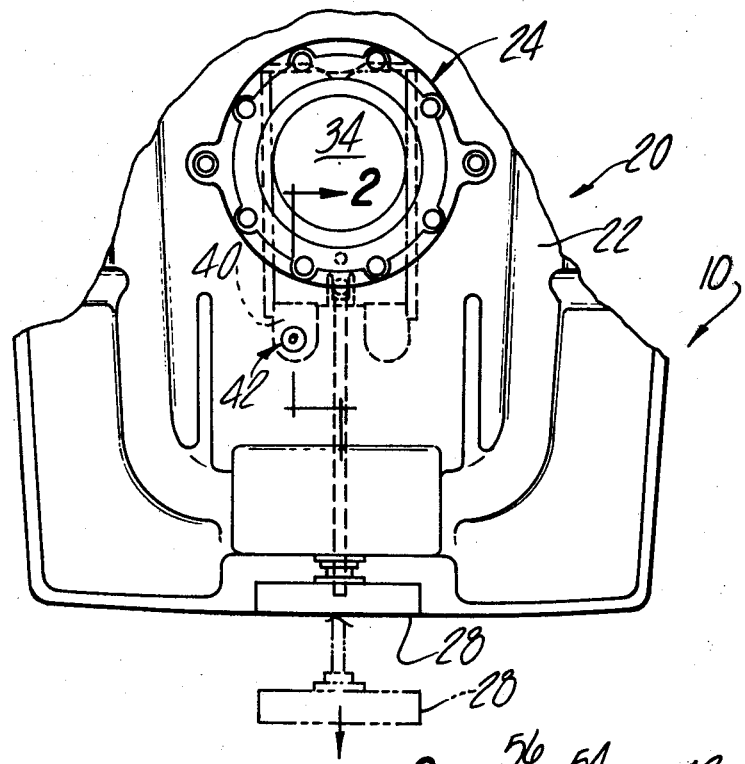
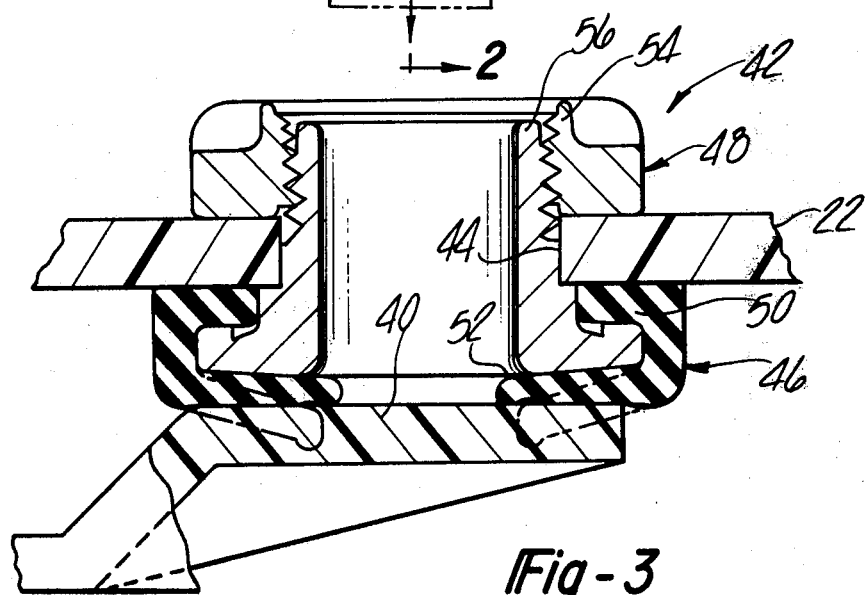

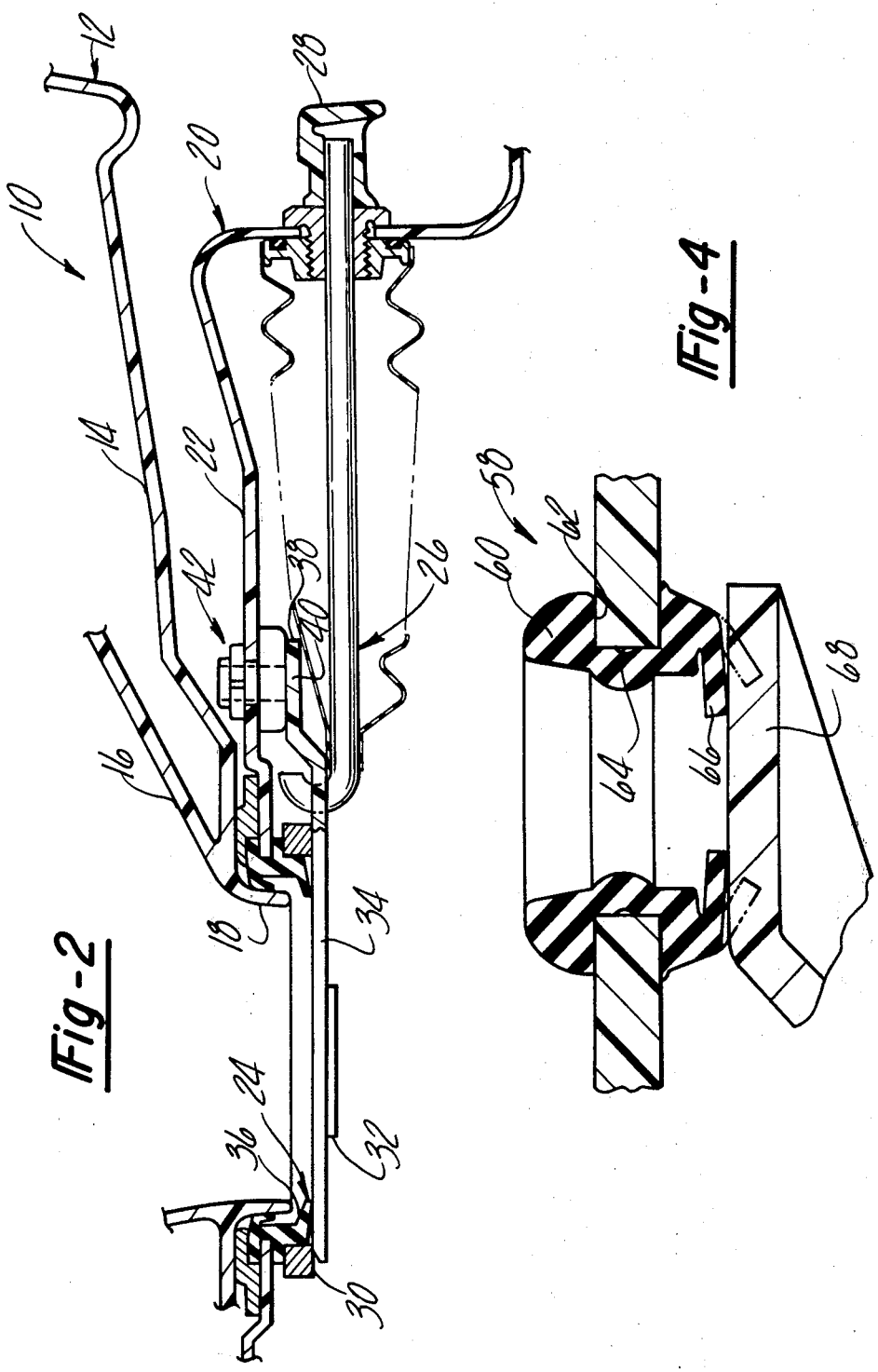

PORTABLE TOILET WITH VENT MEANS FOR THE HOLDING TANK

BACKGROUND OF THE INVENTION

The present invention relates to portable toilets of the types disclosed in U.S. Pat. No. 3,570,018, issued Mar. 16, 1971 to Sargent, et al., and U.S. Pat. No. 3,949,430, issued Apr. 13, 1976 to Miller et al., and is particularly directed to improvements in toilets of this character.

Portable toilets of the type disclosed in the cited patents are used extensively in the travel and recreational fields. Detachable holding tanks are provided which are closed in a sealed condition when the toilets are not in use. The pressure within the closed holding tank may deviate from the ambient pressure for various reasons, such as when traveling from a low to a high altitude, when chemical reaction within the holding tank occurs, and the like. Pressure differential of this nature can create problems for the user of the portable toilet. For example, if a portable toilet has been used at sea level where the atmospheric pressure is relatively high and the toilet is then transported to a recreational area in the mountains where the atmospheric pressure is relatively low, a pressure differential will have been created, because the pressure in the sealed holding tank will have remained essentially that which existed at sea level when the holding tank was closed. If a liquid, such as a chemical deodorant, for example, is now introduced into the toilet bowl for discharge into the holding tank through the valve between the toilet bowl and the holding tank, a jet-like gaseous discharge from the holding tank through the liquid in the bowl may occur as the valve blade is initially opened, causing upward spray of the liquid. Similarly, problems may occur if the contents of a holding tank are to be evacuated when the pressure within the holding tank is greater than the ambient pressure.

Efforts have been made to relieve problems associated with differentials between holding tank pressures and ambient pressures in toilets of the types disclosed in U.S. Pat. No. 3,747,130, issued July 24, 1973 to Sargent et al., and U.S. Pat. No. 4,032,996, issued July 5, 1977 to Sargent et al., but successful solutions to this problem have not been provided in portable toilets of the types wherein a detachable holding tank is utilized.

SUMMARY OF THE INVENTION

The present invention has overcome the inadequacies of the prior art and provides a portable toilet which has a detachable holding tank that is self-venting as an incident to actuating the valve assembly of the holding tank.

According to one form of the present invention, a portable toilet is provided that has an upper section defining a toilet bowl, and a waste holding tank detachably connected to the upper section, the holding tank including a top wall with an inlet port means for receiving waste from the toilet bowl, and a valve assembly mounted on the top wall for movements to an open position to open the inlet port means and to a closed position to close the inlet port means so as to retain the waste in the holding tank in a sealed relation. A vent port means is provided in the holding tank adjacent to the valve assembly, the valve assembly having a vent port closure element movable as an incident to the aforesaid movements of the valve assembly to open the vent port means immediately prior to opening the inlet port means, and to close the vent port means immediately after closing the inlet port means.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary top plan view of a holding tank embodying the present invention;

FIG. 2 is a vertical section taken on the lines 2—2 of FIG. 1 showing the holding tank attached to the upper section of a portable toilet;

FIG. 3 is an enlarged fragmentary section taken vertically through the vent port means, also on the line 2—2 of FIG. 1; and FIG. 4 is a fragmentary sectional view similar to that of FIG. 3, but showing a modified form of the vent port means.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The portable toilet 10 may be constructed essentially the same as that which is illustrated and described in the aforesaid U.S. Pat. No. 3,949,430, and for a more detailed description of the construction of the portable toilet, reference is made to this patent. The portable toilet 10 has an upper section 12 which includes a bottom wall 14 and which also defines a toilet bowl 16 with an outlet port 18 at its bottom. A detachable waste holding tank 20 is provided having a top wall 22 in which is located an inlet port means 24 for receiving waste from the toilet bowl 16. A valve assembly 26 is mounted on said top wall 22 for movement to an open position, as indicated in phantom lines with respect to the handle 28 as shown in FIG. 1, and, as shown in solid lines in FIG. 1, to a position to close the inlet port means so as to retain the waste in the holding tank 20 in a sealed position.

As is explained in greater detail in the aforesaid U.S. Pat. No. 3,949,430, the inlet port means 24 includes vertically spaced guide means, only members 30 and 32 of which are shown, which serve to guide the movement of the flat blade 34 that is connected to the handle 28 of the valve assembly 26. Other vertically spaced guide means, not shown, are also used for this purpose, and again, reference is made to the aforesaid U.S. Pat. No. 3,949,430 for a description of the additional guide means that may be utilized. By virtue of the described construction, a closed and sealed inlet port for the tank is provided when the blade 34 is in the position illustrated in FIG. 2, because the elastomeric seal ring 36 engages the top surface of the blade 34.

In the form of the invention illustrated in the drawings, the blade 34 has an offset portion 38 which defines a closure element 40. The latter cooperates with the vent port means 42 that is located in the top wall 22 and includes the port hole 44 and the elastomeric seal 46 mounted adjacent to the port hole by the attachment means 48. The elastomeric seal has a body portion 50 that is secured by the attachment means 48 to the wall 22 and a lip 52 that normally extends into the path of travel of the closure element 40, and will be affected from its unstressed, broken line position to its closed solid line position by movement of the closure element 40 to the closed position of valve assembly 26. In this embodiment of the invention, the attachment means 48 is a conventional bulkhead nut 54 which is threadedly connected to a conventional bulkhead fitting 56 for clampingly engaging the body portion 50 and top wall 22.

When the valve assembly 26 is in its closed position, as shown in FIG. 2, the blade 34 closes the inlet port means 24 in a sealed relation, and the closure element 40 similarly closes the vent port means 42 in a sealed relation. When the valve assembly 26 is initially moved toward an open position by pulling on the handle 28, the closure element 40 will open the vent port means 42 immediately prior to the blade 34 opening the inlet port means 24. Thus, venting of the holding tank 20 will occur while the blade 34 is still in a sealed relation with respect to the inlet port means 24. If the pressure of the gases in the holding tank 20 exceed the ambient air pressure, venting will occur through the vent port means 42, and the gases that are discharged will merely impinge upon the bottom wall 14 of the upper section 12. Similarly, when the valve assembly 26 is returned to its closed position, the closure element 40 will close the vent port means 42 immediately after the blade 34 closes the inlet port means 24.

It will be understood that the specific construction of the vent port means 42 is not essential to the operation of the invention, but other arrangements can be used, such as are illustrated in FIG. 4. As thereshown, the vent port means 58 is an elastomeric seal in the form of a unitary annulus with a body portion 60 that has a groove 62 around its outer periphery in which the inner edge of the port hole 64 is seated, and the annulus has a lip that extends from the body portion into the path of movement of the closure element 68. In other respects, this form of the vent port means functions the same as the vent port means 42 illustrated in the embodiment of FIGS. 1-3.

It is claimed:

1. A portable toilet comprising an upper section defining a toilet bowl having at its bottom a discharge outlet, and a waste holding tank detachably connected to said upper section, said holding tank including a top wall with an inlet port means for receiving waste from the discharge outlet of said toilet bowl, and a valve assembly mounted on said top wall and including a blade for movements to an open position to open said inlet port means to provide communication with said discharge outlet and to a closed position to close the inlet port means so as to retain the waste in the holding tank in a sealed relation, the improvement comprising a vent port means located in said top wall of said holding tank in juxtaposition with said valve assembly, said valve assembly also including a vent port closure element movable as an incident to said movements of the blade of the valve assembly to open said vent port means immediately prior to the opening of said inlet port means and to close said vent port means after the closing of said inlet port means.

2. The portable toilet that is defined in claim 1, wherein said vent port means includes a port hole in said top wall and an elastomeric seal mounted adjacent to said port hole and extending into the path of movement of said closure element when the latter is in an open position and deflectable into sealed relation with said closure element when the latter is in its closed position.

3. The portable toilet that is defined in claim 2, wherein said said blade is supported for sliding movement across said inlet port means, and said closure element is an offset portion of said blade that is offset a sufficient amount to engage said elastomeric seal during movements of said blade.

4. The portable toilet that is defined in claim 2, wherein said elastomeric seal is an annulus that has a body portion with a groove around its outer periphery in which the inner edge of said port hole is seated and the annulus has a lip that extends from the body portion into the path of movement of said closure element.

5. The portable toilet that is defined in claim 2, wherein said elastomeric seal is an annulus that has a body portion with a lip that extends from the body portion into the path of movement of said closure element, and an attachment means is mounted on the inner edge of said port hole and retains said body portion in place.

6. The portable toilet that is defined in claim 1, wherein said blade is located within said holding tank, said holding tank having therein vertically spaced guide surfaces between which said blade is movable, and said closure element is a portion of said blade.

7. The portable toilet that is defined in claim 6, wherein said vent port means includes a port hole in said top wall and an elastomeric seal that extends into the path of travel of said portion for sealing engagement with the blade when the blade travels in the path permitted by said guide surfaces.

8. The portable toilet that is defined in claim 1, wherein said upper section has a bottom wall and said vent port means is located adjacent to said inlet port means at a location under said bottom wall in spaced relation thereto.

* * * * *